United States Patent [19]

Jenkins

[11] 4,107,469
[45] Aug. 15, 1978

[54] MULTIPLEX/DEMULTIPLEX APPARATUS

[75] Inventor: James R. Jenkins, Fort Worth, Tex.

[73] Assignee: Rockwell International Corporation, El Segundo, Calif.

[21] Appl. No.: 769,494

[22] Filed: Feb. 17, 1977

[51] Int. Cl.² ............................................. H04T 3/18
[52] U.S. Cl. ..................... 179/15 BW; 179/15 AF; 179/15 BD
[58] Field of Search ........... 179/15 A, 15 AF, 15 BD, 179/15 BY, 15 BS, 15 BW, 15.55 R

[56] References Cited

U.S. PATENT DOCUMENTS

| 3,569,631 | 3/1971 | Johannes | 179/15 AF |
|---|---|---|---|
| 3,602,647 | 8/1971 | Kawashima | 179/15 BW |
| 3,622,885 | 11/1971 | Kruszynski | 179/15.55 R |
| 3,660,606 | 5/1972 | DeWitt | 179/15 BY |
| 3,886,317 | 5/1975 | Drapkin | 179/15 BY |
| 3,931,473 | 1/1976 | Ferris | 179/15 AF |
| 3,939,307 | 2/1976 | Bishop | 179/15 BY |

Primary Examiner—David L. Stewart
Attorney, Agent, or Firm—Bruce C. Lutz

[57] ABSTRACT

An encoding scheme for simplifying frame acquisition and access to an auxiliary channel information bit stream and apparatus for implementing same. A pair of incoming data channels are multiplexed onto three communicating data channels wherein one of the channels contains overhead bits and high speed data bits, a second channel contains auxiliary channel bits and high speed data bits and a third channel contains only high speed data bits. With this format, the operational frequency of the frame acquisition circuit is reduced compared to multiplexing to a single channel and the channel containing only high speed data can be used directly for bit error rate (BER) measurements.

7 Claims, 10 Drawing Figures

FIG. 1

FIG. 2 MULTIPLEXER

MULTIPLEX/DEMULTIPLEX APPARATUS

THE INVENTION

The present invention is concerned generally with electronics and more specifically with the multiplexing and demultiplexing of data for transmission over a communication medium.

The prior art has been involved generally with taking a set number of channels or lines of data and by increasing the clock frequency concentrating these plurality of data lines onto a lesser number, normally 1, of lines for transmitting the data before being demultiplexed at the far end. The demultiplexing requires synchronization with this very high speed clock and as the bit per second transmission rate has increased, problems in maintaining line quality, acquiring synchronization and determining error rates have multiplied.

There are instances where, due to above problems and emerging arts such as fiber optics, that, it is more desirable to use a plurality of transmission lines operating at low speeds in preference to a fewer number of lines operating at very high speeds. While the present invention was specifically designed for concentrating two channels of high speed data onto a single eight-phase communication channel, the principles involved apply equally to situations where a plurality of low speed lines find advantageous use over a single high speed line.

It is, accordingly, an object of the present invention to provide improved communication apparatus.

Other objects and advantages of the present invention may be ascertained by a reading of the specification and claims in conjunction with the drawings wherein:

DETAILED DESCRIPTION

Figure 1:
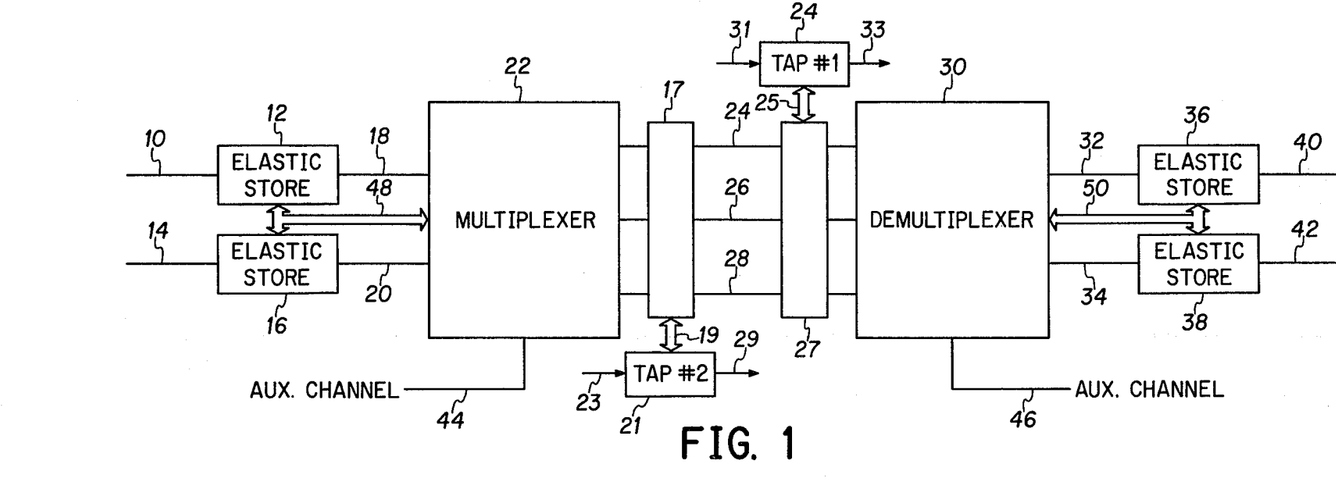
FIG. 1 is a block diagram of the overall system.

In FIG. 1, a first lead 10 provides a first channel bit stream into an elastic store 12. A second data channel is provided on an input lead 14 to an elastic store block 16. The outputs of the two elastic buffers or stores 12 and 16 are provided on lines 18 and 20, respectively, to a multiplexer 22. The multiplexer 22 reconfigures the incoming data onto three output data channels designated, respectively, as 24, 26, and 28, which lines are connected via some transmission medium such as airwaves or physical lines to a demultiplexer 30 which converts the incoming data back to two data channels as output on lines 32 and 34 to elastic buffer or store blocks 36 and 38, respectively. As will be realized, some embodiments would contain an additional line (not shown) for clock signals although most systems would recover clock signals from transmitted (received) data. An output from the system is provided on leads 40 and 42 from elastic stores 36 and 38, respectively. The incoming data on lines 10 and 14 is provided at high speed usually with respective synchronous clocks. It is often desirable that low speed information also be transmitted simultaneous with the multiplexed data and thus an auxiliary channel is illustrated as providing input signals at a low data rate on a lead 44 to multiplexer 22 and a received auxiliary channel is illustrated as being provided on a line 46 as output from demultiplexer 30. Since communications are necessary between the multiplexer and the elastic store, a plurality of connections are designated as 48. A further similar situation is required between the demultiplexer 30 and the elastic stores 36 and 38 and these connections are designated by 50.

FIG. 1 also includes a block 17 which is connected to all three leads, 24, 26, and 28, and is connected by a plurality of leads 19 to a block 21 which is labeled tap number 2. An input lead 23 supplies auxiliary data to be transmitted to the other auxiliary channel access units such as block 27. Likewise, auxiliary data may be supplied to a tap 24 which is connected via a lead 25 to a block 27. Block 27 is also connected to all three of the leads 24, 26, and 28. An output of tap number 1 is designated as 33. This output may be received from the auxiliary channel leads 44 and may be received from signals supplied on lead 23 to tap number 2. An output from tap number 2 is labeled 29.

Figure 2:
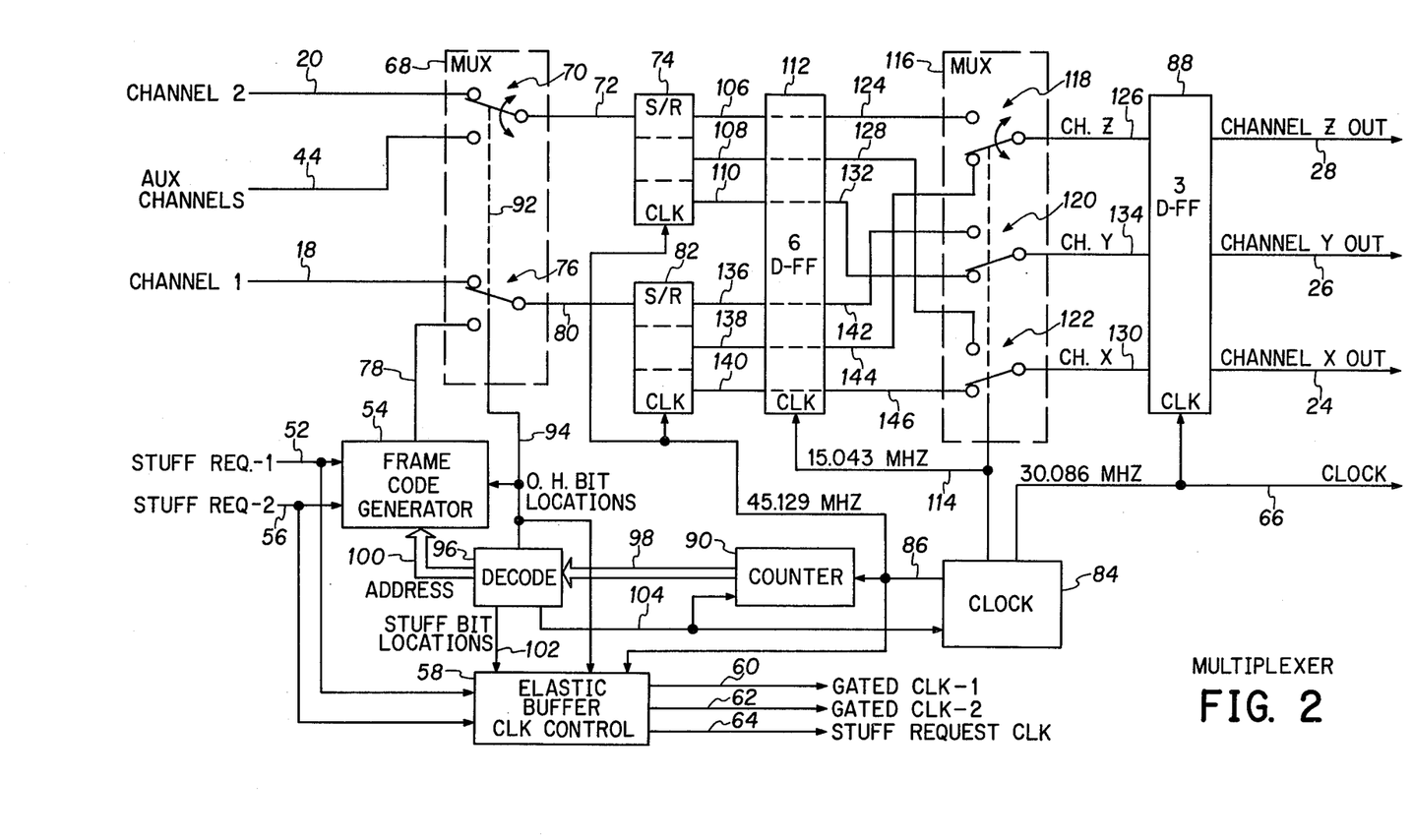
FIG. 2 is a block schematic diagram of the multiplexer section of FIG. 1.

In FIG. 2, channel 1 is designated as lead 18 while channel 2 is 20 and the auxiliary channel is 44 and the X, Y, and Z output channels are designated 24, 26, and 28, such as shown in FIG. 1. A stuff request 1 lead 52 is shown as an input to a frame code generator 54. A stuff request 2 lead 56 is also input to this same frame code generator. These leads are also input to an elastic buffer clock control 58. Outputs of elastic buffer clock control 58 are designated as 60, 62, and 64. The leads 52, 56, 60, 62, and 64 are part of the plurality of leads 48 shown in FIG. 1. A multiplex block designated as 68 is illustrated receiving the channel 1 and channel 2 inputs as well as the auxiliary channel input. A switch generally designated as 70 is shown alternating between input lead 20 and input lead 44 and is connected to an output lead 72 which provides signals to a shift register 74. A further switch generally designated as 76 alternates between input lead 18 and a lead 78 received from frame code generator 54. An output of switch 76 is provided on a lead 80 to a shift register 82. A clock 84 provides clock input signals on a lead 86 to each of the shift registers 74 and 82. In one embodiment of the invention, this clock occurred at a rate of 45.129 MHz (hereinafter often rounded to 45 MHz). The clock 84 also provides a 30.086 MHz (or 30 MHz) clock on lead 66 to a block 88. The lead 86 is also connected to the input of a counter 90. As will be realized, from a dash line designated as 92, both switches 70 and 76 are operated simultaneously in accordance with electrical signals received on a lead 94 from a decode block 96. Lead 94 also provides input signals to frame code generator 54 and to elastic buffer clock control 58. The signals on lead 94 are indicative of overhead bit locations and as illustrated the decode block 96 is decoding counts as provided by counter 90 on a plurality of leads 98. The decode block 96 then provides address signals on a plurality of leads 100 to frame code generator 54 and stuff bit location signals to clock control 58 on a lead 102. Finally, reset signals are provided on a lead 104 to counter 90 and to clock 84.

The shift register 74 receives three time serial bits on lead 72 at the 45 MHz rate. These bits are output on leads 106, 108, and 110 to three flip-flops of a six flip-flop register 112. The flip-flops (not shown internally) are activated at a 15 MHz rate in accordance with clock signals received on a lead 114 from clock 84. These signals are then held in the three D flip-flops of 112 until passed through a mux 116. Mux 116 has three sets of switches illustrated in mechanical representation as 118, 120, and 122, each of which is operated in accordance with an electrical signal received on clock lead 114. The signals from input lead 106 to block 112 are passed on a lead 124 to switch 118 and at the appropriate time are output on a channel Z lead 126 to the uppermost D flip-flop in block 88 before being output on lead 28. The signals from lead 108 are passed through a flip-flop in block 112 to a lead 128 enroute through a switch 122 to a channel X output lead 130. Lead 130 is connected to the lowermost flip-flop in block 88 which has as its output lead 24. Lead 110 from shift register 74 is connected through the associated flip-flop in block 112 to a lead 132 to one input of switch 120 where it is passed to an output lead 134 which is further designated as channel Y. Lead 134 passes bits through the associated flip-flop within block 88 to the channel Y output lead 26. Shift register 82 operates in a manner similar to that of 74 and from input lead 80 provides three output leads 136, 138, and 140. Lead 136 is connected via a flip-flop and a lead 142 to switch 120. Lead 138 is connected via a flip-flop and a lead 144 to switch 118 and lead 140 is connected via a flip-flop and a lead 146 to switch 122.

Figure 3:
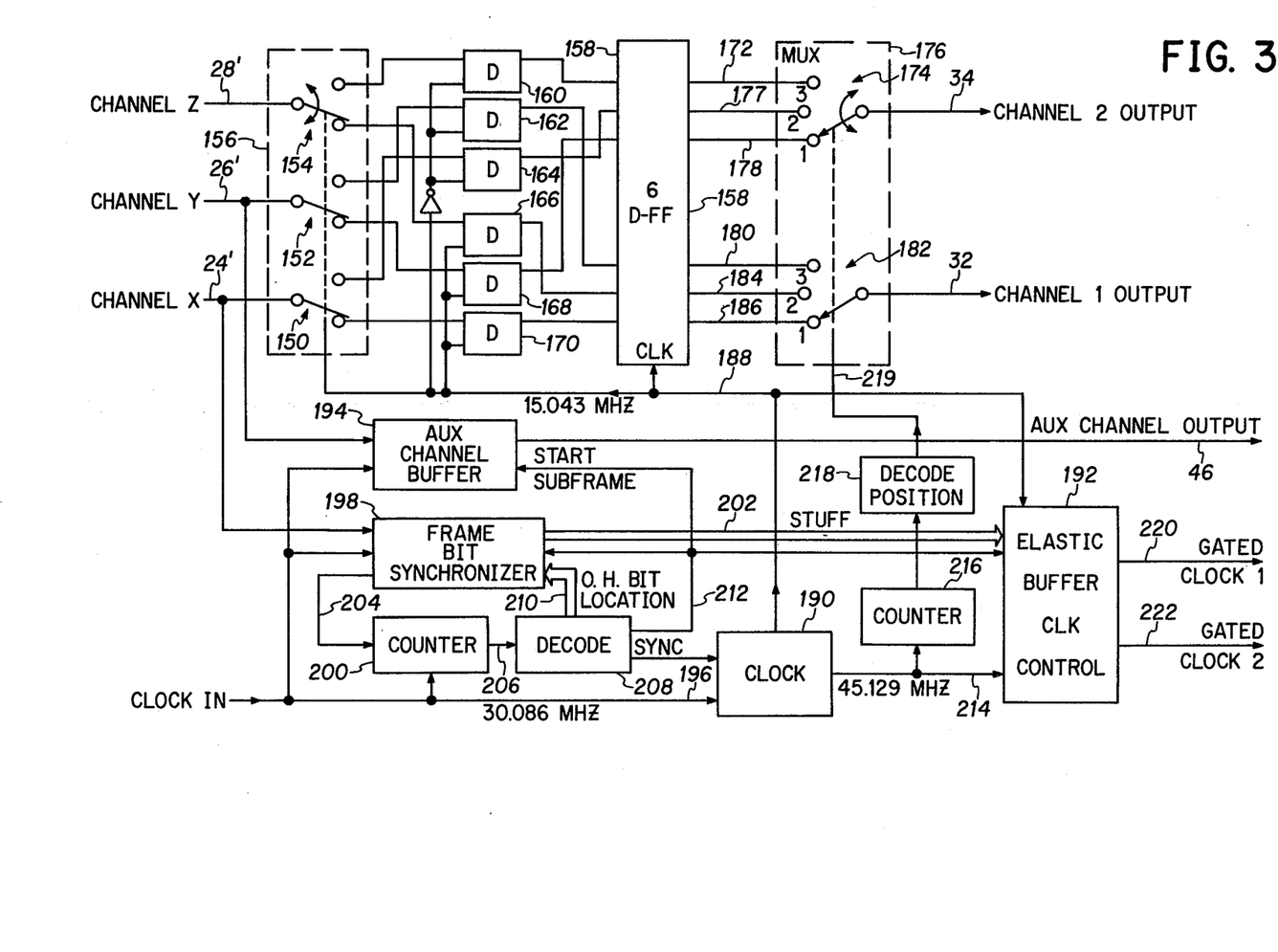
FIG. 3 is a block schematic diagram of the demultiplexer section of FIG. 1.

In FIG. 3, input leads for channels X, Y, and Z are designated as 24', 26', and 28', to correspond with the associated output channels of the multiplexer of FIG. 2. All three of these inputs are connected to associated electronic switches which for convenience are illustrated as mechanical switches and given the designations 150, 152, and 154, respectively. The three switches 150 through 154 are contained within a dash line mux block designated as 156. Switch 154 has a first output terminal which is connected to a D input of a D-type flip-flop 160 which has its Q output connected to an upper or first flip-flop of the six D flip-flop block 158. The output of this particular flip-flop is provided on lead 172 to the upper terminal of a switch 174 within a multiplex box 176. The lower terminal of switch 154 is connected to a D input of a D-type flip-flop 166 whose output is connected to the second lowest flip-flop within block 158. This D flip-flop has its output on lead 184. The second switch 152 has its upper terminal connected to a D input of a D-type flip-flop 162 whose Q output is connected through the fourth D flip-flop of block 158 and output on lead 180. The lower terminal of switch 152 is connected to a D input of flip-flop 168 whose Q output is supplied to the third D flip-flop of block 158 and the output of which is supplied on lead 178 to switch 174. The third switch 150 has its upper terminal connected to a D input of a flip-flop 164 whose output is connected to the second flip-flop within block 158 and whose output is connected on a line 177 to a second terminal of switch 174. The lower terminal of switch 150 is connected to a D flip-flop 170 whose output is connected to the last flip-flop within block 158 and the output of which is supplied on lead 186. The leads 180, 184, and 186 are connected to three terminals as shown of a switch 182 within block 176. The output of switches 174 and 182 are contained on leads 34 and 32, respectively, as channel 2 and 1 outputs. Each of the flip-flops in block 158 are clocked or activated at a 15 MHz rate from signals received on a lead 188 as supplied by a clock block 190. This signal is also used to activate the switches within block 156 and to clock the three flip-flops 166, 168, and 170. The signal on lead 188 is further inverted in an inverting logic gate and used to clock blocks 160, 162, and 164. Block 190 also supplies signals on lead 188 to an elastic buffer clock control 192. Lead 26' is also connected to an auxiliary channel buffer 194 which provides an auxiliary channel output on the previously referenced lead 46. Clock 190 is provided a clock signal nominally at a 30 MHz rate on a lead 196 which is also provided to the auxiliary channel buffer 194 as well as to a frame bit synchronizer 198 and a counter 200. The clock IN signal is synchronous with the data on channels X, Y, and Z and is, as previously mentioned, from either a separate line or recovered from the transmitted data. Frame bit synchronizer 198 supplies stuff bit signals on a plurality of leads 202 to the elastic buffer 192. It also supplies signals on a lead 204 to the counter 200 which has an output on lead 206 to a decode block 208. The decode block 208 has a plurality of leads designated as 210 which provide overhead bit information to the frame bit synchronizer 198. It also provides start subframe signals on a lead 212 to the frame bit synchronizer 198 as well as to the auxiliary channel buffer 194 and to the elastic buffer 192. The clock 190 provides nominally 45 MHz signals on a lead 214 to the clock control 192 as well as to a counter 216 which provides output signals to a decoder 218 whose output 219 is used to activate the switches 174 and 182 within multiplex unit 176. As further illustrated, the 24' lead provides signals to the frame bit synchronizer and the elastic buffer clock control provides output signals on leads 220 and 222 which are supplied to the elastic stores 36 and 38 as illustrated in FIG. 1 on a plurality line connection 50.

Figure 4:
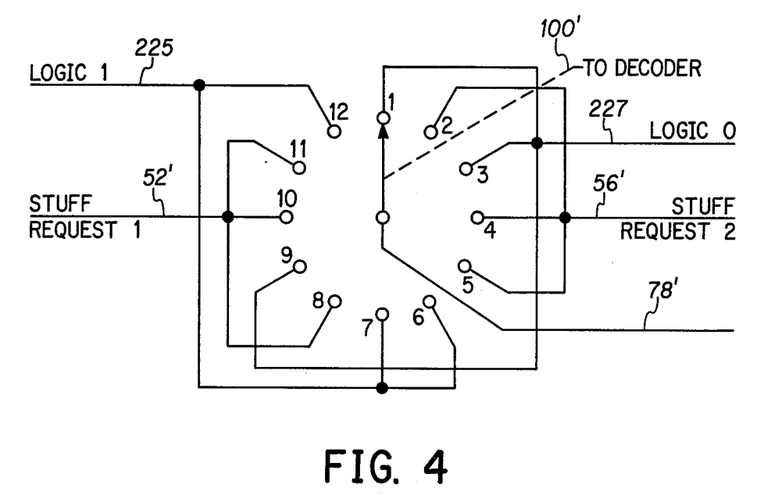
FIG. 4 is a symbolic representation of a circuit for accomplishing the requirements of the frame code generator of FIG. 2.

In FIG. 4, a mechanically actuated switch representation of the contents of frame code generator 54 is provided. The schematic diagram is intended to illustrate the fact that in accordance with signals from decoder 96, the output line 78' is sequentially connected to the various terminals. As indicated, 52' and 56' are the stuff request 1 and stuff request 2 leads and an additional lead 225 is connected to a logic 1 level and a lead 227 is connected to a logic 0 level. Thus, signals are input to the stationary terminals and are output on lead 78' to the multiplex unit 68. The rotating contact is sequentially positioned in accordance with addresses supplied on input 100', in the embodiment shown the connection advances each subframe or twelve times per frame (one full revolution).

Figure 5:
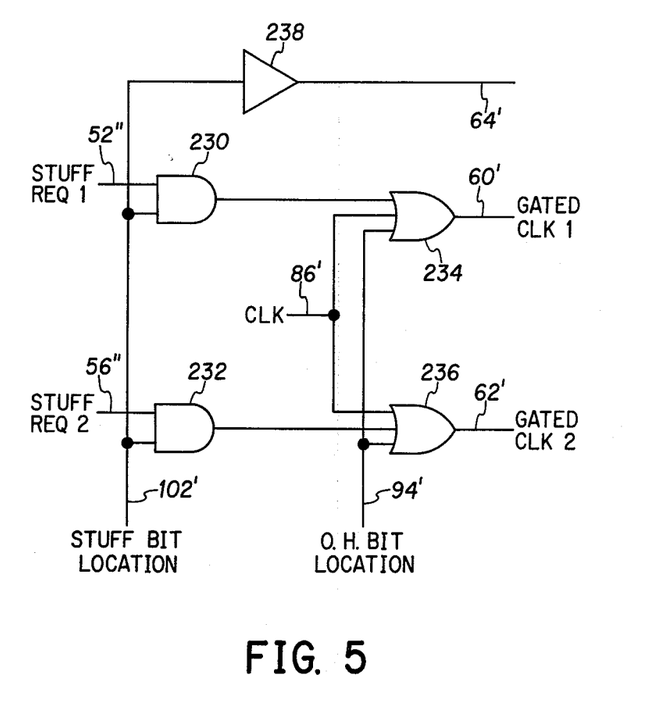
FIG. 5 is a schematic diagram of the elastic buffer control of FIG. 2.

In FIG. 5, a detailed schematic diagram is illustrated of one embodiment of the internal connections of block 58 of FIG. 2. A pair of AND gates 230 and 232 receive inputs from the stuff request 1 and stuff request 2 lines 52" and 56", respectively, as well as an input from the stuff bit location lead 102'. The outputs of these two AND gates are supplied to OR gates 234 and 236, respectively, as illustrated. These OR gates both receive inputs from clock leads 86' at the 45 MHz rate and each receive an input from the overhead bit location lead 94'. Outputs of the two OR gates are the gated clock 1 and gated clock 2 leads which are given designations as 60' and 62'. The stuff bit location lead 102' is also inverted in an amplifier 238 and output on lead 64'.

Figure 6:
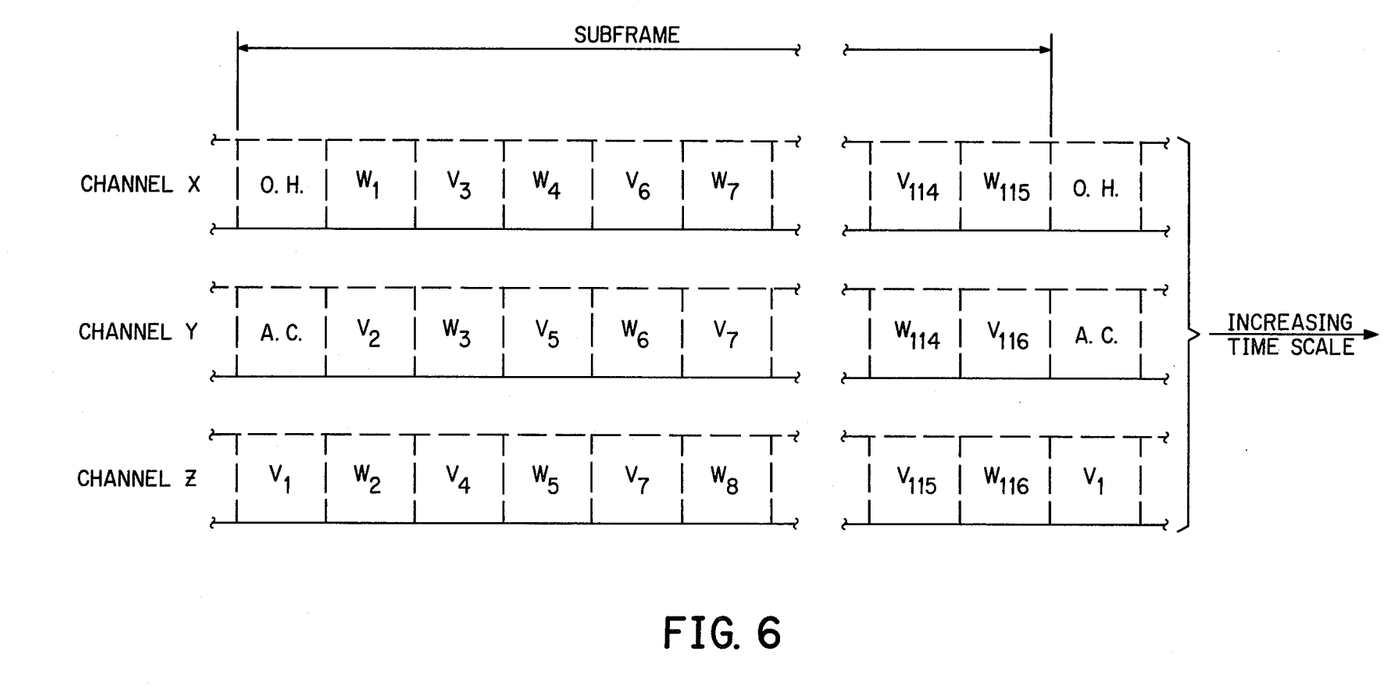
FIG. 6 is an individual bit representation of the contents of a subframe used in the multiplexed communication channels.

In the waveform presentation of FIG. 6, it is illustrated that the first bit output on the channel X lead 24 during each subframe is an overhead bit and the next bit position is allocated for channel 2 (a W bit). The third bit in channel X for the subframe is allocated for channel 1 (a V bit). Referring to the next presentation, it will be noted that the first bit output on line 26, which is channel Y, is an auxiliary channel bit while the second bit is allocated to channel 1. The channel Z presentation shows that all the bits are either V or W with the first bit being $V_1$. The last bit in the subframe for channel Z is the 116th bit allocated for channel 2 during that subframe even though that is the 78th bit for channel Z in a given subframe.

Figure 7:
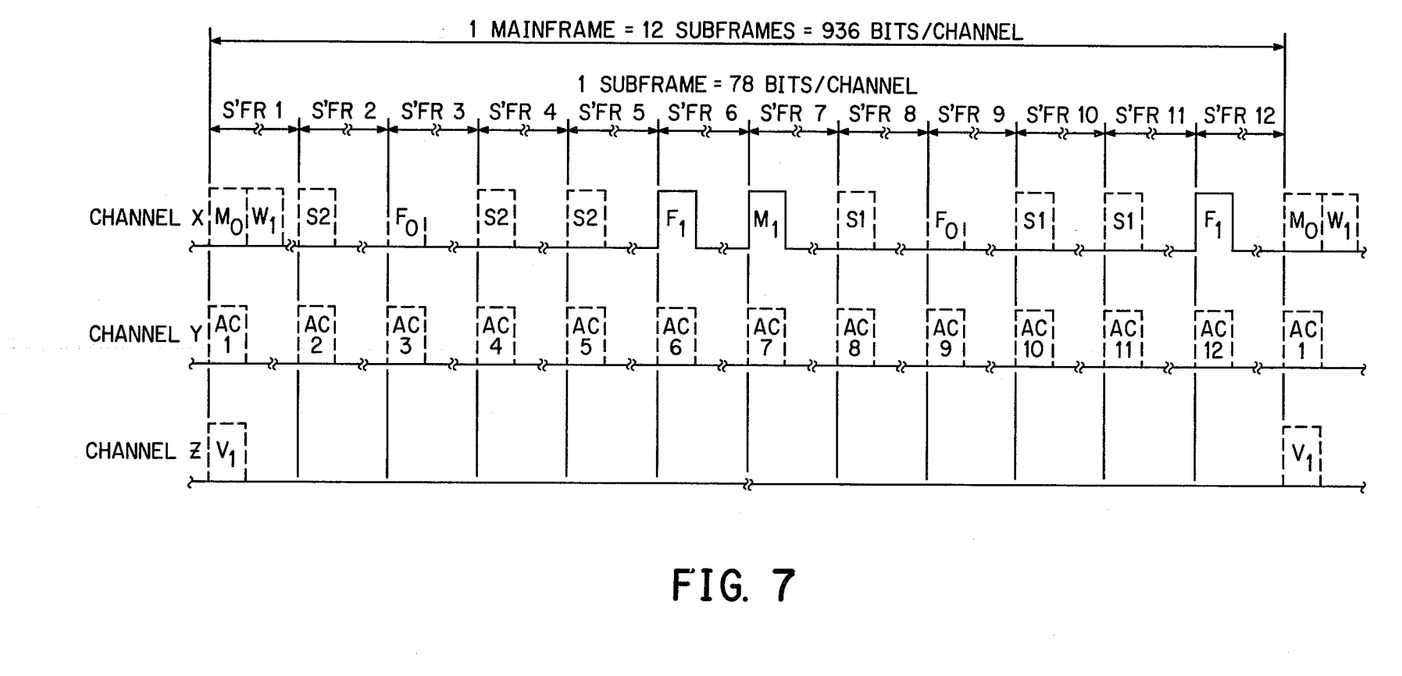
FIG. 7 is a waveform representation of a main frame containing twelve frames of FIG. 6.

FIG. 7 presents the same channels X, Y and Z, but illustrates that there are twelve subframes in a main frame and provides specific designations as to each of the overhead bits found in the first bit location of each subframe during the main frame. For ease in understanding, the high speed data bits have not been shown. Where the bit is drawn solid as in subframe 6, 7, and 12, the bit is always a logic 1. Where the bit is dashed as in subframes 2, 4, 5, 8, 10, and 11, the value may be either a logic 0 or a logic 1 in accordance with information to be provided by the frame code generator to the multiplex unit regarding stuff codes. The first bit of subframes 1, 3, and 9, are partially dashed and indicate that these bits are always logic 0.

It will be noted that in channel Y of each of the subframe first bits are designated in a dashed line fashion. This indicates that each of these low speed auxiliary channel bits may be either logic 1 or logic 0 depending upon the data being provided.

Since bit 1 of subframe 1 for channel Z is a stuff bit location, this bit position is also illustrated to simplify later discussions. The same comments apply to the $W_1$ bit position for channel X in subframe 1.

Figure 8:
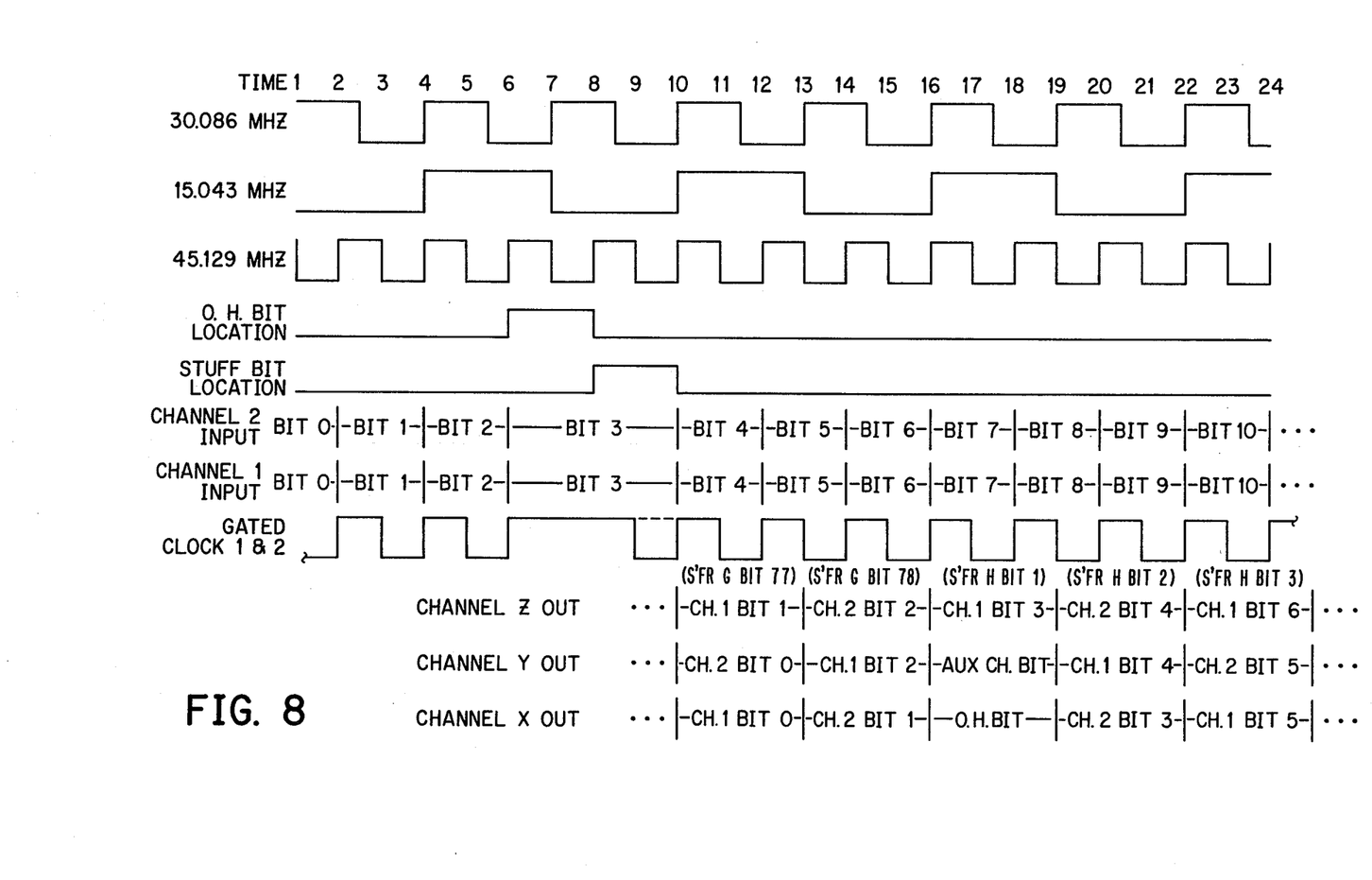
FIG. 8 is a waveform presentation used in explaining the operation of the remaining figures.

In FIG. 8, the uppermost row of figures indicates the time of occurrence of each of the changes in logic level for the high frequency or 45 MHz clock. The two lower frequency clocks are synchronous with and derived in conjunction with the 45 MHz clock and thus their waveform edges coincide every fourth clock period such as 4, 7, and 10. The waveform illustrating the overhead bit location indicates that it changes to a logic 1 from the 6th to 8th time periods. The stuff bit location is a logic 1 for the next two time periods following. The gated clock 1 and 2 waveforms represent signals on two lines, 60 and 62. The signals are normally, but not always, identical and thus are shown as a single waveform. Between times 6 and 10 there is normally only one bit received from the channel 1 and channel 2 inputs. However, whenever a stuff bit is required by channel 1 (or 2) as indicated from information provided on lead 52 (56) of FIG. 2, an extra bit is inserted into this time period and the gated clock 1 (2) is blanked between 9 and 10 so that between times 6 and 10, there are no new bits received from channel 1 (2). (If stuff bits are only required for one incoming channel, the gated clocks 1 and 2 will not be identical.)

The final three representations in FIG. 8 indicate that there is a delay in time from the time a specific bit appears at the input of the multiplexer 68 in FIG. 2 before it appears at the output of the three D flip-flops in FIG. 2. Thus, the bit 0 appears between 0 and 2 at the input to the mux but appears at the output on channel X between times 10 and 13 and the input bit 0 on channel 2 appears on channel Y at the output between the same two time periods if there is no stuff bit. The indication above these last three channel representations indicates that the bit 0 is an arbitrary position and that in accordance with the time frames of the multiplexer, actually occurs near the end of a subframe which is indicated as subframe G. A new subframe is commenced between times 16 and 19 where an overhead bit appears on channel X in subframe H. The overhead bit and the auxiliary channel bit are allowed to be inserted into the subframe due to the non-use of the bit which is presented as bit 3 starting at time 6.

Figure 9:
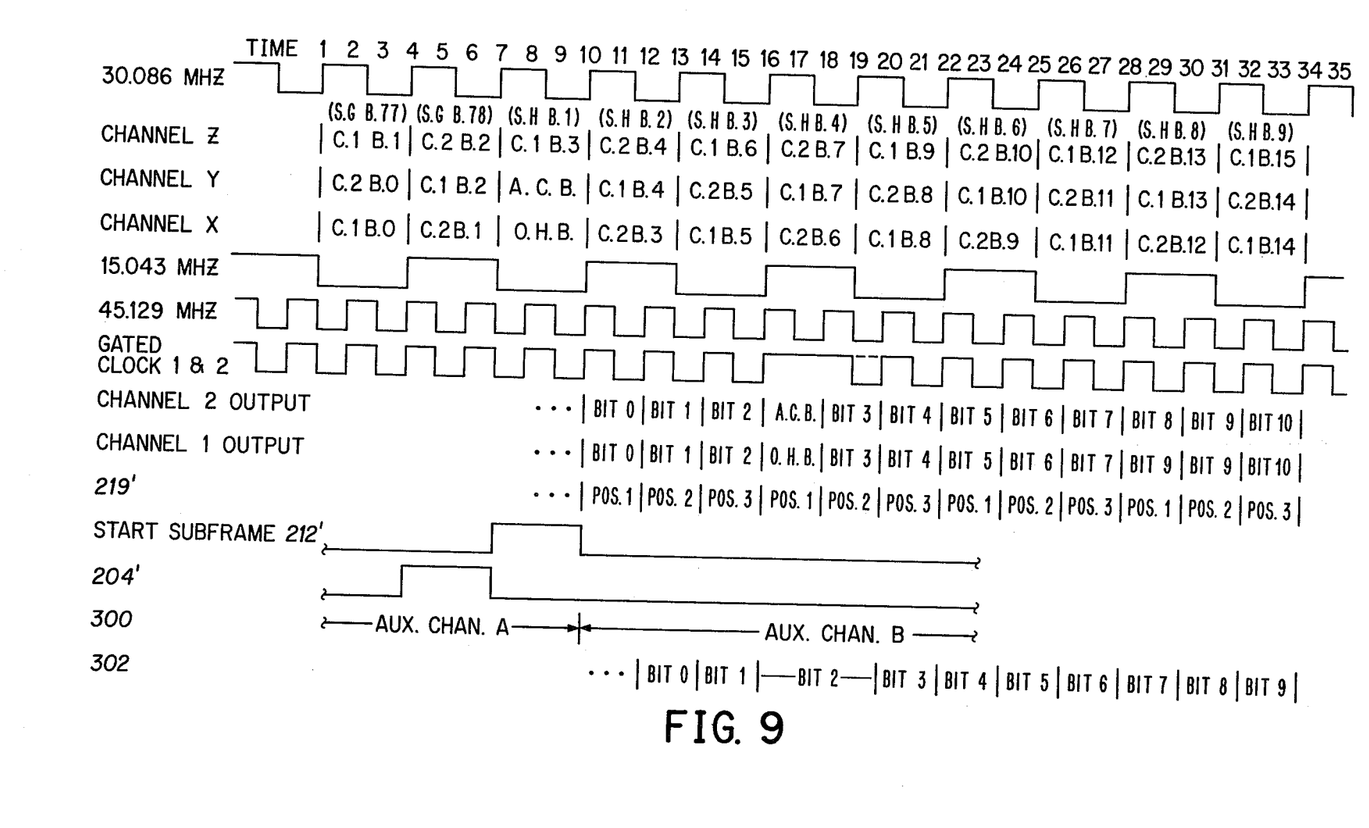
FIG. 9 comprises a set of waveforms for use in explaining FIG. 3.

FIG. 9 contains a plurality of waveforms which are labeled so as to be easily correlated with FIG. 3. In other words, the 30 MHz clock is that provided as an input on lead 196. The channel Z, Y, and X waveforms are those found on input leads 24', 26', and 28'. The 15 MHz clock is that found at lead 188. The 45 MHz clock is that found on lead 214 while the gated clock 1 and 2 is that clock found on output leads 220 and 222. As would be surmised, all of these bit streams or data streams are indicative of those found at simultaneous positions on the time graph at the upper portion of this figure. While the waveforms have been shown on a different scale from that shown in FIG. 8, the difference was merely due to space requirements and not because the signals occur at a different rate. The channel 1 and channel 2 output signals are those found on leads 32 and 34. The waveform start subframe is that found on lead 212 while the next waveform below is labeled 204 and may be found applied to counter 200. This illustrates that it is normally a logic 0 throughout a subframe except between times 4 and 7 when it is a logic 1. The information which is labeled 219' illustrates the relative position of the switches 174 and 182 in FIG. 3 for each time period. Waveform or information presented as 302 at the bottom of FIG. 9 is used to illustrate the contents of the storage registers within the elastic buffers receiving the signals on leads 32 and 34. It may be noted that the signal 204' is substantially synonymous with the sync signal being applied to the clock block 190 by decode block 208 since it is this signal which is utilized to assure the proper phasing of the three clock signals. It may also be realized that the 15 MHz signal positions the switches as shown within block 156 in the logic 0 condition of the signal.

Figure 10:
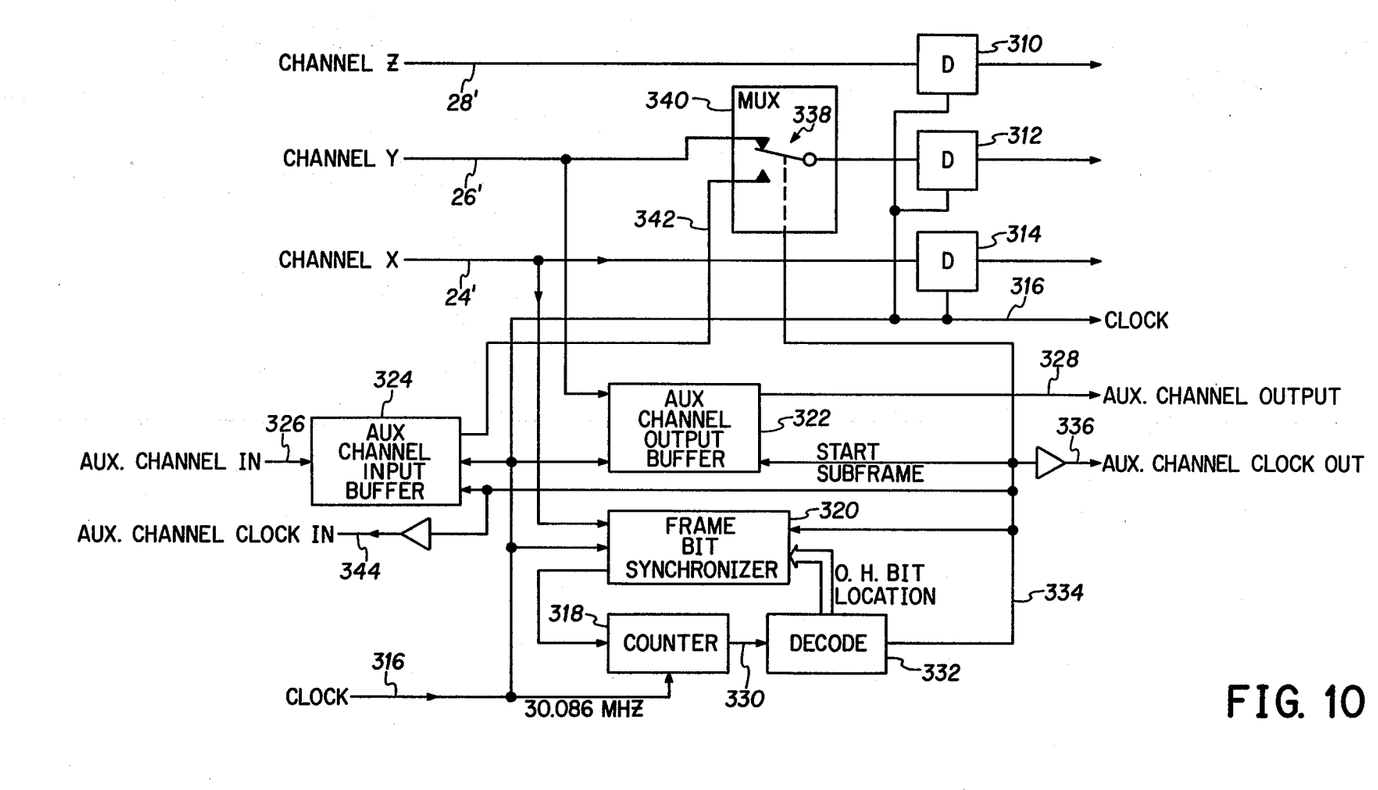
FIG. 10 is a block diagram of one of the aux channel access blocks such as the combination of 17 and 21.

In FIG. 10, the additional detail of the auxiliary channel access block such as 17 is provided wherein the incoming channels X, Y, and Z are labeled similar to that provided in FIGS. 1, 2, and 3. A plurality of D flip-flops 310, 312, and 314 are illustrated on channels Z, Y, and X, respectively. Each of these D flip-flops is clocked by a clock signal on a lead 316 as obtained from an input provided by the clock 84 of multiplexer 22 of FIG. 2. Although the source of the clock signals is not illustrated, these can be obtained on a separate line or can be recovered from the transmitted (received) data. This clock signal on 316 is used to activate a counter 318 and also to provide clock signals to a frame bit synchronizer 320, an auxiliary channel output buffer 322 and an auxiliary channel input buffer 324. An auxiliary channel data input lead 326 provides input data to be placed on the main transmitting channels and an output lead 328 is used to provide output data of the auxiliary channel from the main channels. Leads 326 and 328 may be synonymous with the leads 23 and 29 of FIG. 1. The counter 318 supplies signals on a lead 330 to a decode block 332. The decode block 332 decodes the count and supplies a signal at the appropriate time on lead 334 to not only clock frame bit synchronizer 320 and the auxiliary output buffer channel 322 but also to provide a clock signal on lead 336 which is used to place the auxiliary channel output bit in a register (not shown) and to operate a switch 338 within a mux block 340. Mux 340 either passes channel Y signals directly through to 312 when signals are as shown, or accepts signals from the auxiliary channel input 326 via buffer 324 when it is in the alternative position. These signals are received on lead 342 from buffer 324. The start subframe line 334 is further used to operate buffer 324 as well as provide an output on 344 to actuate the register supplying the input data on 326.

As indicated, all the parts of FIGS. 2, 3 and 10 are completely standard products in the form of flip-flops, serial-to-parallel registers, etc., and thus the only two items which need any explanation at all are the frame code generator 54 and the elastic buffer clock control 58 which have been diagrammatically illustrated in FIGS. 4 and 5. The elastic store concept and the blocks 12, 16, 36, and 38, are well known to those skilled in the art and more information on elastic stores may be obtained from many sources; one example of which is a book entitled "Transmission Systems for Communications" revised in 4th Ed., printed by Bell Telephone Laboratories, Inc. Typical information may be found in this book from pages 614 to 618.

OPERATION

As will be realized by those skilled in the art, the present system is advantageously employed in a communication system containing a plurality of repeater and/or drop and insert stations. As data is transmitted across the country, it periodically needs amplifying and in the amplification process it is ofttimes desirable to be able to communicate to other repeater stations or to data sources. Additionally, during the communication transmission process, there will be occasions such as the occurrence of towns wherein it is desired to drop certain portions of the communicated data and insert data to be distributed elsewhere. The demultiplexer blocks such as FIG. 3 are used at the drop and insert stations to retrieve the data for distribution. The multiplexing blocks such as FIG. 2 are used to reassemble the data which is not dropped along with the data which is to be inserted for further transmission in the system.

The access blocks, such as shown in FIG. 10, are utilized to provide low speed communications between repeater stations and drop and insert stations within the system. Although normally, only one access block such as FIG. 10, would be utilized per station, more blocks can be used if desired.

To reduce drawing complexity, all the clock lines have not been illustrated in all instances although some have been shown for illustrative purposes.

When it is desired that two or more asynchronous signals be time division multiplexed (TDM) there arises a requirement that the various digital input signal sources be synchronized. Also required is a framing scheme for inserting a frame code into the resultant multiplexed data stream. The frame code allows correct identification of the various channel bits which have been multiplexed together whereby demultiplexing at the receiving end may be accomplished correctly.

One method of providing this synchronization is the use of pulse stuffing. The basic concept of pulse stuffing is to raise the rate of each of the incoming signals which are nominally the same over a given time interval, $\Delta t$, as governed by a locally generated clock to a rate higher than twice the nominal frequency or rate of the incoming signals. Each incoming signal is passed through an elastic buffer which in conjunction with a multiplexer maintains on the average the incoming bit rate on the output thereof by gating off the output data stream periodically. Each digital input signal, as output by its individual elastic buffer, is multiplexed onto a resultant data stream instantaneously at a rate higher than the incoming rate. During the gated OFF period of the output of the elastic buffer 12 or 16 (which averages the higher rate to the incoming rate) for a given digital input signal, the time slots resulting in the multiplexed stream may be utilized for other purposes. These vacated time slots are utilized in the illustrated embodiment of the inventions by the frame code, other inserted codes and one or more lower speed data channels.

As illustrated in FIG. 1, an elastic buffer such as 12 or 16 is required for each of the incoming data streams such as provided on lines 10 and 14, respectively. The time slots generated in accordance with the above synchronization approach allow an auxiliary channel to be input on line 44 into the multiplexer 22 as well as to allow the insertion of the other overhead information. The output rate of each of the elastic store blocks 12 and 16 is kept equal, on the average, to the input rate by decreasing the higher instantaneous output rate by gating OFF the clock in regular intervals at a periodic rate as well as gating OFF additional pulses at irregular intervals at a non-periodic rate. This lowers the average of the output data rate to the input data rate. The additional pulses gated OFF at the non-periodic rate occurs when stuff pulses are inserted into the multiplexed data stream. The elastic buffer blocks 12 and 16 have circuitry which monitors the storage area of the digital input data required internally. When the storage area is in danger of being depleted due to the average output rate being higher than the input rate due to gating OFF the output rate at a periodic rate only, a stuff request signal is generated on one of lines 52 or 56. The signal on one of these lines causes a stuff (dummy) pulse to be inserted in the resultant bit multiplexed data stream in a designated time slot for the digital input data stream for which the stuff request signal was generated. When the stuffing occurs, the clock to the elastic buffer is gated OFF for one clock interval (time 8–10). The stuffing occurs as often as necessary to reduce the average of the output rate to that of the input data rate. The stuff request input signal on either of lines 52 or 56 is noted by elastic buffer clock control 58 and when the next chance for a stuff bit occurs as denoted by a signal from decode block 96 on line 102, the clock output provided on the appropriate line 60 or 62 to the elastic buffer 12 or 16 is gated OFF for one clock interval (time 8–10). The stuff request signal also causes the frame code generator 54 to insert a plurality of logic 1 S1 pulses in a given main frame as indicated in FIG. 7 if the stuff bit is to occur in the following main frame thereby preventing depletion in the storage area of elastic store 12 and produces logic 1's for the S2 overhead bits if the stuff bit is supposed to occur in the channel 2 stuff bit location. These stuff bits occur as the V1 or W1 bits in the first subframe of the next following main frame with V1 being the first bit in that frame obtained from the data stream passing through elastic store 12 and W1 being the first bit in the data stream of that main frame passing through elastic store 16.

The receiving demultiplexer 30 is continually checking the S1 and S2 bits so as to notify elastic buffer clock control 192 when a stuff bit for either (or both) channel outputs occur so that the stuff bit(s) is discarded and are not transmitted to the corresponding elastic buffer (36 or 38). The elastic buffer clock control outputs a signal on the appropriate lead 220 or 222 to its output elastic store 36 or 38. As previously indicated and used in the discussion, the two input digital data streams on lines 10 and 14 are termed either channel 1 or channel V and channel 2 or channel W. These two input channels are multiplexed along with inserted codes and one or more lower speed channels are output on three digital data streams termed output channels X, Y, and Z.

The framing format for time division multiplexing the three data streams is illustrated in FIG. 7 as used in this given specific embodiment. The illustration delineates a main frame comprising 2,808 digital bits during each main frame or 936 bits per channel. Each main frame is divided into twelve subframes, each of which comprise 234 digital bits or 78 bits per channel per subframe. It may be noted that the frame code comprises two separate components and appears exclusively in the time slots of channel X. The M and F bits are indicative of the frame synchronization code while the S bits are the stuff codes. The low speed auxiliary channel fills the periodically vacated time slots in channel Y while channel Z has no periodically vacated time slots.

As previously indicated, V1 as illustrated in FIGS. 6 and 7, is a data bit from channel 1 unless the preceding stuff codes for channel 1 (S1 in channel X) are all logic 1 for the preceding main frame. In the case of the previous S1's all being logic 1, the V1 is a stuff bit and is not to be demultiplexed into channel 1 by the demultiplexer 30 and its associated elastic store 36. The same is true for W1 with regard to channel 2 and the preceding stuff code for channel 2 (S1 in channel X) and elastic store 38.

The waveforms of FIG. 8 illustrate the timing relationships of the control signals in FIG. 2. The switching mechanisms 70 and 76 within mux 68 are controlled by the overhead bit location signal on lead 94, a representation of such signal being illustrated in FIG. 8. When the overhead bit location signal changes to a logic 1 for one 45 MHz clock period, the switches 70 and 76 are changed to the alternate input so that line 72 is connected to input channel 44 and line 80 is connected to the output 78 of frame code generator 54. The gated clock signals on lines 60 and 62 are 45.129 MHz signals (synchronous with the 45 MHz clock) which are gated OFF when the overhead bit location is high as illustrated between times 6 and 8 in FIG. 8. The same action will occur as illustrated by dashed line (time 9–10) to the gated clock signal −1 when the stuff bit location signal is active simultaneous with the stuff request signal on lines 52 or gated clock signal −2 when the stuff bit location is active with the stuff request signal on line 56. This action will extend bit 3 for the channel being stuffed to time 12. Bit 4 is offset to one time interval to 10–12, as are all succeeding bits. Otherwise, a clock signal will be passed during the time period 8 to 10. Due to the retrieval format of this data from the shift register 82 by the mux 116, one of the stuff bits occur in one column of a subframe while the other stuff bit occurs in the next column. The value of the stuff bit will be that of bit 3. This is illustrated both in FIG. 6 where V1 and W1 occur in separate columns and in FIG. 8 where channel 1 bit 3 occurs between time 16 and 19 on channel Z and channel 2 bit 3 occurs between times 19 and 22. Under a stuff condition, bit 3 occurs in the V1 (or W1) location and the V2 (or W2) location.

The positive transition of the 45 MHz signal at time 8 will clock an auxiliary channel bit from line 44 into the first of three storage locations in register 74. This register is a three-stage serial IN parallel OUT register and is similar to register 82. This previously mentioned positive transition also clocks a frame code bit into shift register 82 from frame code generator 54. The negative transition of the overhead bit at time 8 clocks the next frame code bit onto the output of frame code generator 54. The positive transition of the 45 MHz signal at time 10 will clock bit 3 of channel 2 into the upper position of register 74 simultaneous with the transferring of the previous auxiliary channel bit into the second location of register 74. In a similar manner, the bit 3 of channel 1, enters the first location of register 82 while the previous frame code bit is transferred to the second position. These signals are obtained from the elastic store blocks through the action of the gated clock signals 1 and 2. The positive transition at time 6 places the logic level of the incoming data (bit 3) onto lines 20 and 18. The positive transition at time 10 of the gated clock signal clocks bit 4 as indicated in FIG. 8 onto these same lines 18 and 20. The positive transition at time 12 places bit 4 of both channels into their respective shift registers 74 and 82 while shifting the previous entered bits by one storage location. At time 13, the parallel output of register 74 comprises bit 4 of channel 2 on lead 106, bit 3 of channel 2 on lead 108 and the auxiliary channel bit on lead 110. Likewise, for shift register 82, bit 4 of channel 1 appears on lead 136, bit 3 of channel 1 appears on lead 138 and the frame code bit appears on lead 140. The values are clocked by the negative transition of the 15 MHz clock at time 13 into the six D flip-flops of block 112. The output mux 116 is also controlled by the 15 MHz clock so that when this signal is low as indicated between times 13 and 16 the switches 118, 120 and 122 internal to mux 116 are in the positions as shown in FIG. 2. During the next interval from times 16 to 19, the switches internal mux 116 change to the alternate position. At time 16, the output of mux 116 has the frame code bit on the channel X line 130, the auxiliary channel bit on the channel Y line 134 and bit 3 of channel 1 on the channel Z line 126. These values are clocked into the output register 88 by the positive transition of the 30 MHz line at time 16 so that during the time period indicated from 16 to 19, the outputs are as illustrated in the last three lines of FIG. 8. At time 16, the output of mux 116 changes to the data bits as illustrated between times 19 and 22 in the bottom three lines of FIG. 8. These values are clocked into the output register 88 by the positive transition at time 19.

As will be realized, the incoming bit stream illustrated in FIG. 8 is given an arbitrary set of numbers. The start of a subframe at the output of the three D flip-flops 88 occurs at time 16. However, the bits used in this output are first supplied as bit 3 between times 6 and 10 and are first clocked into the S/R at time 10. Comparison of the output between times 16 and 19 with the illustration shown on FIG. 6 will show that the desired multiplexing of the incoming data has been accomplished.

From the previous discussions, it will be determined that the bits for a given channel 1 or 2, are positioned alternately on the channels X, Y, and Z. The switch 156 in combination with the multiplexer 158 and the D flip-flops contained in the section from 160 to 170 provide a demultiplexing action of this information. It will be noted that one position of the multiplexer 156 provides signals to the lower set of the D flip-flops 166 through 170 while the upper position supplies signals to the set of flip-flops 160 through 164. The use of these two sets of three flip-flops each is to provide synchronization of application of data bits to the block 158. These bits are interchanged in position as illustrated between the six individually shown D flip-flops and the block 158 so that upon being outputted through the multiposition switches 174 and 182 within mux 176, the data is reconfigured as shown in FIG. 9 in the rows labeled channels 1 and 2 outputs. As before, the designation bit 0 is merely a position notation for the purpose of explanation and has nothing to do with the frames themselves. The actual subframe does start in the illustration shown at time 7 for the incoming signal and at time 16 for the signals leaving mux 176. Also, as before, the dash line in the gated clock 1 and 2 waveform illustrates the fact that a stuff bit is a dummy bit for that particular channel on that particular subframe. In other words, if the stuff bit is a dummy bit for that occasion, the output elastic buffer is not actuated with the clock signal and thus does not accept the signal. Therefore, the dummy bit is in essence dropped from further consideration. The previously referenced material by Bell Telephone also pertains to the resynchronization of the data bits so that they are output from the elastic buffer at a constant data rate which is equivalent to that received by the input elastic buffer in FIG. 1.

The demultiplexer of FIG. 3 uses the frame bit synchronizer 198 to synchronize the counter 200 via 204 to the frame synchronization code appearing on channel X and demultiplexes in the reverse order of the multiplexer. The gated clocks and output data to the output elastic buffer (36 or 38) are the same data as supplied to the input of the system at an average rate which is the same as the input rate at the input to the system. The output elastic buffer through the use of an internal phase lock loop provides the same data and average data at its output as input to the system and the instantaneous data rate is substantially the same as that originally input into the system.

Although the demultiplexer could have been synchronized at the 45 MHz rate through the use of synchronizing circuits attached to multiplex unit 176, the synchronizing would take considerably longer than the approach presently used and would involve a great deal of increased circuitry. By having all the synchronizing information on a single channel, the number of bits which must be scanned in order to obtain synchronization is decreased by one-third and although the bit interval is longer, there is a considerably faster acquisition time. Once synchronization is obtained by the frame bit synchronizer 198, the counter 200 is synchronized by 204 and a start subframe signal decoded from 206 by decoder 208 is supplied to the auxiliary channel buffer which indicates the appropriate time to remove the auxiliary channel bits from the beginning of each subframe and buffer 194 outputs these on lead 46. A decoded signal, SYNC from decode 208 is also used to synchronize the clock 190 so that the switches within multiplexers 156 and 176 are in the proper starting position to decode the incoming information and output the proper data streams on leads 32 and 34.

By having all the overhead or frame bits on one channel and all the low speed auxiliary channel bits on a second channel, the circuitry for removing the information relevant thereto is considerably simplified. The simplification occurs due to various factors, such as the circuitry, can operate a 30 MHz rather than 45 or 90 MHz and the low speed auxiliary channel bits occur on the second channel coincident with the overhead and frame bits. In addition to this simplification of circuitry for removing the necessary information, the third channel or channel Z does not contain any overhead bits and thus may be used for bit error rate information measurements without affecting the low speed auxiliary channel communication.

In FIG. 10, it will be observed that most of the blocks are identical to similarly named blocks in FIG. 3. The unit does have the addition of the mux 340, the D flip-flops 310 through 314 and the buffer 324. In operation, the system normally supplies signals from input leads 24' through 28' to the output of the D flip-flops 310 through 314. When an auxiliary channel bit is to be inserted in place of a bit position on channel Y, start subframe lead 334 activates switch 338 at the beginning of each subframe and the data bit from auxiliary channel input buffer 324 is inserted into the input of D flip-flop 312. This inserted data bit combined with the data bits received on channels X and Z are then output upon the occurrence of the next clock appearing on lead 316. As will be realized, the three D flip-flops are required to keep synchronization of the various data bits on the three channels during the insertion and deletion of data bits in the auxiliary bit position of the Y channel. The removal of data bits from channel Y for outputting on lead 328 occurs continuously, if desired, with no interruption of the channel Y information.

As previously indicated, the reason for the auxiliary channel access block of FIG. 10 is to provide communications between various stations and thus data which is input on lead 326 is output on channel Y to another similar block within the system.

As will be realized, the system may be designed so that the auxiliary channel is either a party line wherein all the auxiliary channel bits are used for communication by each access block or with further modifications can be designed so that even lower speed communication can be provided by different access blocks receiving data bits from only certain of those bits during each frame.

Although the embodiment illustrated shows two channels of high speed data being changed in data rate as multiplexed onto three output channels, it has been found advantageous in some instances to have a single high speed input data channel be output as two or three lower speed channels. The high speed information is still multiplexed with overhead bits and usually with auxiliary channel low speed bits.

Thus, the present concept is usable for one or more high speed incoming data channels which are presented on two or more lower speed intermediate communication channels before being demultiplexed to the original configurations. While as shown and described, the incoming data streams are non-synchronous, the inventive concept will operate equally well with synchronous input data streams which in some versions permits elimination of stuff bits.

The preferred embodiment of this invention has been described using specific frequencies and waveforms. It will be realized by those skilled in the art that the concept may be used at many different frequencies and for different communication medium and the concept is not limited to the specific embodiment illustrated. Therefore, I wish to be limited only by the scope of the appended claims.

What is claimed is:

1. A multiplexing communication system for transmitting two given data rate sources on three lower data rate communication channel means before demultiplexing to two channels at the data sink comprising, in combination:
   first and second means for supplying first and second channels of data respectively at given substantially identical data rates;
   multiplexing means, connected to said first and second means, for interleaving incoming data consecutively on X, Y, and Z data channel output means with overhead data bits used for demultiplexing wherein only said X output means includes said overhead data bits and each of said channels operate at lower data rates than said given data rate;
   transmission means; and
   demultiplexing means, interconnected by said transmission means for receiving signals from said X, Y, and Z output means of said multiplexing means, including frame bit synchronizer means operating at the rate of said incoming X channel for demultiplexing to two output data channels operating at said given data rates in accordance with overhead data received on said X channel.

2. Apparatus as claimed in claim 1 comprising, in addition:
   auxiliary means for supplying low speed auxiliary channel data bits to said multiplexing means which low speed bits occur at a much lower rate than said lower data rate;
   means, in said multiplexing means, for interleaving said auxiliary channel data bits with said other data bits only on channel Y; and
   means, in said demultiplexing means, for synchronizing to data in said Y channel via said X channel to remove said auxiliary channel data bits and output same from said demultiplexing means.

3. A multiplex data system comprising, in combination:
   means for supplying first and second data channels each at a given data bit rate;
   means for supplying third channel data bits at a lower data bit rate; and
   multiplex means, connected to said above means, for combining said first, second and third data channel bits along with overhead synchronizing information bits onto X, Y, and Z identical bit rate transmission channels, the bit rate of said transmission channels being intermediate said given and lower bit rates, wherein all transmission channels include given speed data bits but only the X channel contains third channel data bits and only the Y channel contains overhead bits.

4. Apparatus as claimed in claim 3 comprising, in addition:
   stuff code means, operating as part of said multiplex means, for inserting stuff bits in two of said transmission channels and for inserting stuff code bits only in said Y channel.

5. Apparatus as claimed in claim 3 comprising, in addition:
   demultiplexing means, including X, Y, and Z channel input means and first, second and third data channel output means, for synchronizing receipt of data on said X, Y and Z channel input means in accordance with overhead bits in said Y channel and operating at the data bit rate of data in said Y channel whereby said third data channel output means is supplied with data only from said X channel and said first and second data channel output means supply output signals duplicative of the originally supplied first and second data channels to said multiplex means; and
   transmission means interconnecting said multiplex and demultiplex means.

6. Apparatus as claimed in claim 5 comprising, in addition:
   stuff code generator means in said multiplex means for inserting stuff code bits into the overhead bit stream of said Y channel for synchronizing said incoming data bit streams with the bit streams of transmission channels by inserting stuff bits therein; and
   stuff code detection means in said demultiplex means operating at the data bit rate of said transmission channels for removing stuff bits from the bit stream before being output at said first and second data channel output means.

7. A multiplex data system comprising, in combination:
   means for supplying at least first and second data bit channels of data bits each at a given data bit rate;
   means for supplying at least one additional data bit channel of data bits at a lower data bit rate than said given data bit rate; and
   multiplex means, connected to said above-named means, for combining the data bits from said at least first and second data bit channels with the bits from said at least one additional data bit channel along with overhead synchronizing information bits onto a plurality of identical bit rate transmission channels, said identical bit rate transmission channels including at least one each of X, Y and Z type channels, the bit rate of said transmission channels being intermediate said given and lower bit rates, wherein all transmission channels include given speed data bits, only said X type channels contain third channel data bits and only Y type channels contain overhead bits.

* * * * *